United States Patent
Martin et al.

(10) Patent No.: US 11,701,709 B2
(45) Date of Patent: Jul. 18, 2023

(54) METHODS FOR NANOFUNCTIONALIZATION OF POWDERS, AND NANOFUNCTIONALIZED MATERIALS PRODUCED THEREFROM

(71) Applicant: HRL Laboratories, LLC, Malibu, CA (US)

(72) Inventors: John H. Martin, Oxnard, CA (US); Brennan Yahata, Santa Barbara, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 81 days.

(21) Appl. No.: 17/221,046

(22) Filed: Apr. 2, 2021

(65) Prior Publication Data

US 2021/0220909 A1 Jul. 22, 2021

Related U.S. Application Data

(62) Division of application No. 15/880,474, filed on Jan. 25, 2018, now Pat. No. 11,052,460.

(Continued)

(51) Int. Cl.
*B22F 1/054* (2022.01)
*B22F 9/04* (2006.01)
(Continued)

(52) U.S. Cl.
CPC ............... *B22F 9/04* (2013.01); *B22F 1/054* (2022.01); *B22F 1/09* (2022.01); *B22F 1/12* (2022.01);
(Continued)

(58) Field of Classification Search
None
See application file for complete search history.

(56) References Cited

U.S. PATENT DOCUMENTS

| | | | |
|---|---|---|---|
| 5,305,726 | A | 4/1994 | Scharman et al. |
| 5,340,012 | A | 8/1994 | Beeferman et al. |

(Continued)

FOREIGN PATENT DOCUMENTS

| | | |
|---|---|---|
| JP | 2011054892 A | 3/2011 |
| KR | 1020080105250 A | 12/2008 |
| WO | 2005017220 A1 | 2/2005 |

OTHER PUBLICATIONS

Chen et al., "Rapid control of phase growth by nanoparticles," Nature Communications 5:3879 DOI: 10.1038/ncomms4879, May 9, 2014.

(Continued)

*Primary Examiner* — George Wyszomierski
(74) *Attorney, Agent, or Firm* — O'Connor & Company; Ryan P. O'Connor

(57) ABSTRACT

Some variations provide a method of making a nanofunctionalized metal powder, comprising: providing metal particles containing metals selected from iron, nickel, copper, titanium, magnesium, zinc, silicon, lithium, silver, chromium, manganese, vanadium, bismuth, gallium, or lead; providing nanoparticles selected from zirconium, tantalum, niobium, or titanium; disposing the nanoparticles onto surfaces of the metal particles, in the presence of mixing media, thereby generating nanofunctionalized metal particles; and isolating and recovering the nanofunctionalized metal particles as a nanofunctionalized metal powder. Some variations provide a composition comprising a nanofunctionalized metal powder, the composition comprising metal particles and nanoparticles containing one or more elements selected from the group consisting of zirconium, tantalum, (Continued)

niobium, titanium, and oxides, nitrides, hydrides, carbides, or borides thereof, or combinations of the foregoing.

22 Claims, 10 Drawing Sheets

Related U.S. Application Data

(60) Provisional application No. 62/463,952, filed on Feb. 27, 2017, provisional application No. 62/452,989, filed on Feb. 1, 2017.

(51) Int. Cl.

| | |
|---|---|
| *B22F 9/06* | (2006.01) |
| *B33Y 70/00* | (2020.01) |
| *B22F 1/17* | (2022.01) |
| *B22F 1/145* | (2022.01) |
| *B22F 10/28* | (2021.01) |
| *B22F 10/73* | (2021.01) |
| *B22F 1/00* | (2022.01) |
| *B22F 1/12* | (2022.01) |

(52) U.S. Cl.
CPC ............... *B22F 1/145* (2022.01); *B22F 1/17* (2022.01); *B22F 9/06* (2013.01); *B22F 10/28* (2021.01); *B22F 10/73* (2021.01); *B33Y 70/00* (2014.12); *B22F 2009/043* (2013.01); *B22F 2009/047* (2013.01); *B22F 2301/052* (2013.01); *B22F 2301/10* (2013.01); *B22F 2301/15* (2013.01); *B22F 2301/205* (2013.01); *B22F 2301/255* (2013.01); *B22F 2301/30* (2013.01); *B22F 2998/10* (2013.01); *B22F 2999/00* (2013.01)

(56) References Cited

U.S. PATENT DOCUMENTS

| | | | |
|---|---|---|---|
| 5,462,712 A | 10/1995 | Langan et al. | |
| 6,024,915 A | 2/2000 | Kume et al. | |
| 6,071,628 A | 6/2000 | Seals et al. | |
| 6,254,757 B1 | 7/2001 | Lashmore et al. | |
| 6,368,427 B1 | 4/2002 | Sigworth | |
| 9,238,877 B2 | 1/2016 | Krause et al. | |
| 2002/0136884 A1 | 9/2002 | Oechsner | |
| 2003/0077473 A1 | 4/2003 | Bretschneider et al. | |
| 2003/0104147 A1 | 6/2003 | Bretschneider et al. | |
| 2005/0238528 A1 | 10/2005 | Lin et al. | |
| 2006/0065330 A1 | 3/2006 | Cooper et al. | |
| 2008/0069716 A1* | 3/2008 | Chelluri | B22F 1/16 419/33 |
| 2010/0288243 A1 | 11/2010 | Kaburagi et al. | |
| 2010/0303722 A1* | 12/2010 | Jin | A61L 27/18 623/23.72 |
| 2012/0135142 A1 | 5/2012 | Yang et al. | |
| 2012/0315399 A1 | 12/2012 | Feng et al. | |
| 2012/0321892 A1* | 12/2012 | Seals | B22F 1/142 977/773 |
| 2013/0012643 A1 | 1/2013 | Monsheimer et al. | |
| 2013/0146041 A1 | 6/2013 | Hijii et al. | |
| 2013/0152739 A1 | 6/2013 | Li et al. | |
| 2015/0252451 A1 | 9/2015 | Al-Aqeeli et al. | |
| 2015/0337423 A1 | 11/2015 | Martin et al. | |
| 2016/0339517 A1* | 11/2016 | Joshi | B22F 1/17 |
| 2017/0016095 A1 | 1/2017 | Karlen et al. | |
| 2017/0021417 A1* | 1/2017 | Martin | B22F 3/1028 |
| 2017/0252851 A1 | 9/2017 | Fulop et al. | |
| 2020/0055118 A1* | 2/2020 | Djemai | C22C 32/0031 |

OTHER PUBLICATIONS

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. 2011, 11, 4166-4174.

Högberg et al., "Reactive sputtering of δ-ZrH2 thin films by high power impulse magnetron sputtering and direct current magnetron sputtering," Journal of Vacuum Science & Technology A 2014, 32, 041510.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials 2017, 10, 919; doi:10.3390/ma10080919.

Roberts et al., "A novel processing approach for additive manufacturing of commercial aluminum alloys" Physics Procedia 83 ( 2016 ) 909-917.

Martin et al., "3D printing of high-strength aluminium alloys" Nature, vol. 549, Sep. 21, 2017.

* cited by examiner 310   320

- 610: Provide metal particles containing one or more metals
- 620: Provide nanoparticles containing one or more elements or derivatives thereof
- 630: Dispose nanoparticles onto surfaces of metal particles, in the presence of liquid-phase mixing media, generating nanofunctionalized metal particles
- 640: Isolate and recover nanofunctionalized metal particles Nanofunctionalized metal alloy

710 Provide metal particles containing one or more metals

↓

720 Provide nanoparticles containing one or more elements or derivatives thereof

↓

730 Dispose nanoparticles onto surfaces of metal particles, in the presence of liquid-phase mixing media containing a compressed/liquefied gas or supercritical fluid, generating nanofunctionalized metal particles

↓

740 Isolate and recover nanofunctionalized metal particles

↓

Nanofunctionalized metal alloy

810 — Provide metal particles containing one or more metals

820 — Provide nanoparticles containing one or more elements or derivatives thereof 830 — Dispose nanoparticles onto surfaces of metal particles, in the presence of gas-phase mixing media, generating nanofunctionalized metal particles 840 — Isolate and recover nanofunctionalized metal particles Nanofunctionalized metal alloy

910 Provide metal particles containing one or more metals

920 Provide nanoparticles containing one or more elements or derivatives thereof

930 Dispose nanoparticles onto surfaces of metal particles, utilizing electrostatic interactions, generating nanofunctionalized metal particles

940 Isolate and recover nanofunctionalized metal particles

Nanofunctionalized metal alloy

1010 Provide metal particles containing one or more metals

1020 Generate *in situ* nanoparticles containing one or more elements or derivatives thereof

1030 Dispose nanoparticles onto surfaces of metal particles, in the presence of mixing media, after or during step 1020, generating nanofunctionalized metal particles

1040 Isolate and recover nanofunctionalized metal particles

Nanofunctionalized metal alloy

METHODS FOR NANOFUNCTIONALIZATION OF POWDERS, AND NANOFUNCTIONALIZED MATERIALS PRODUCED THEREFROM

PRIORITY DATA

This patent application is a divisional application of U.S. patent application Ser. No. 15/880,474, filed on Jan. 25, 2018 (now allowed), which is a non-provisional application with priority to U.S. Provisional Patent App. No. 62/452,989, filed on Feb. 1, 2017, and to U.S. Provisional Patent App. No. 62/463,952, filed on Feb. 27, 2017, each of which is hereby incorporated by reference herein.

FIELD OF THE INVENTION

The present invention generally relates to methods of functionalizing metal powders or other powders, and functionalized materials produced according to these methods.

BACKGROUND OF THE INVENTION

The assembly of nanoparticles onto substrates is relevant for a wide variety of applications. There are known coating methods available to deposit nanoparticles. The methods differ by their ability to control particle packing density and layer thickness, the ability to use different particles, and the complexity of the method and instrumentation needed.

Metal-based additive manufacturing, or three-dimensional (3D) printing, has applications in many industries, including the aerospace and automotive industries. Building up metal components layer by layer increases design freedom and manufacturing flexibility, thereby enabling complex geometries while eliminating traditional economy-of-scale constraints. However, currently only a few alloys, the most relevant being AlSi10Mg, TiAl6V4, CoCr, and Inconel 718, can be reliably printed. The vast majority of the more than 5,500 alloys in use today cannot be additively manufactured because the melting and solidification dynamics during the printing process lead to intolerable microstructures with large columnar grains and cracks. 3D-printable metal alloys are limited to those known to be easily weldable. The limitations of the currently printable alloys, especially with respect to specific strength, fatigue life, and fracture toughness, have hindered metal-based additive manufacturing. See Martin et al., "3D printing of high-strength aluminium alloys," *Nature* vol. 549, pages 365-369, which is hereby incorporated by reference.

In particular, during solidification of many alloys, the primary equilibrium phase solidifies first at a different composition from the bulk liquid. This mechanism results in solute enrichment in the liquid near the solidifying interface, locally changing the equilibrium liquidus temperature and producing an unstable, undercooled condition. As a result, there is a breakdown of the solid-liquid interface leading to cellular or dendritic grain growth with long channels of interdendritic liquid trapped between solidified regions. As temperature and liquid volume fraction decrease, volumetric solidification shrinkage and thermal contraction in these channels produces cavities and hot tearing cracks which may span the entire length of the columnar grain and can propagate through additional intergranular regions.

Fine equiaxed microstructures accommodate strain in the semi-solid state by suppressing coherency that locks the orientation of these solid dendrites and promotes tearing. Producing equiaxed structures requires large amounts of undercooling, which has thus far proven difficult in additive processes where high thermal gradients arise from rastering of a direct energy source in an arbitrary geometric pattern.

What is needed is an approach to control solidification microstructure by promoting nucleation of new grains of metal alloys, such as additively manufactured metal alloys. New methods of incorporating nanoparticles into metal or metal alloy powders are also desired. Use of nanoparticles in additive manufacturing has been described, but uniformity and scale-up have been difficult.

SUMMARY OF THE INVENTION

The present invention addresses the aforementioned needs in the art, as will now be summarized and then further described in detail below.

Some variations provide a method of making a nanofunctionalized metal powder, the method comprising:

(a) providing metal (or metal alloy) particles containing one or more metals selected from the group consisting of aluminum, iron, nickel, copper, titanium, magnesium, zinc, silicon, lithium, silver, chromium, manganese, vanadium, bismuth, gallium, lead, and combinations thereof;

(b) providing nanoparticles containing one or more elements selected from the group consisting of zirconium, tantalum, niobium, titanium, and combinations, oxides, nitrides, hydrides, carbides, or borides thereof;

(c) disposing the nanoparticles onto surfaces of the metal particles, in the presence of mixing media, thereby generating nanofunctionalized metal particles; and (d) isolating and recovering the nanofunctionalized metal particles as a nanofunctionalized metal powder.

In some embodiments, the nanoparticles are present at a concentration of at least 0.1 vol %, 1 vol %, or 5 vol % in the nanofunctionalized metal powder.

Step (b) may include ex situ generation of the nanoparticles, followed by step (c). In some embodiments, step (b) comprises in situ generation of the nanoparticles, followed by or simultaneously with step (c).

Step (c) may utilize one or more forces selected from the group consisting of physical forces, chemical forces, electrical forces, electrostatic forces, electrochemical forces, electromagnetic forces, and combinations thereof.

In some embodiments, step (c) is a wet process and the mixing media contains a liquid phase. For example, step (c) may include wetting, spraying, or pouring the liquid phase onto the surfaces of the metal particles. The liquid phase may contain an organic solvent, an inorganic solvent, or a combination thereof. The liquid phase may contain a compressed and liquefied gas and/or a supercritical fluid.

In some embodiments, step (c) is a dry process and the mixing media contains a gas phase. Step (c) may include settling, blowing, or circulating the gas phase onto the surfaces of the metal particles. The gas phase may contain air, nitrogen, argon, carbon dioxide, or a combination thereof.

Step (c) may include mechanical mixing of the nanoparticles with the metal particles, wherein the mechanical mixing may be selected from stirring, rolling, vibrating, grinding, milling, sonicating, ball milling, or a combination thereof.

In some embodiments, the method further comprises utilizing an assembly aid to enhance retention of the nanoparticles onto surfaces of the metal particles. The assembly aid may be selected from the group consisting of surfactants, salts, dissolved ions, charged molecules, polar or non-polar solvents, hierarchically sized particulates, surface etchants, and combinations thereof.

Step (d) may include removing the mixing media by atmospheric drying, pressure reduction, vacuum evacuation, filtering, or a combination thereof.

Some variations provide a composition comprising a nanofunctionalized metal powder, the composition comprising:

(a) metal (or metal alloy) particles containing one or more metals selected from the group consisting of aluminum, iron, nickel, copper, titanium, magnesium, zinc, silicon, lithium, silver, chromium, manganese, vanadium, bismuth, gallium, lead, and combinations thereof; and (b) nanoparticles containing one or more elements selected from the group consisting of zirconium, tantalum, niobium, titanium, and oxides, nitrides, hydrides, carbides, or borides thereof, and combinations of the foregoing.

The nanoparticles may be present at a concentration of at least 0.1 vol %, such as at least 1 vol %, in the nanofunctionalized metal powder. The average number ratio of nanoparticles to metal particles may vary widely, such as from about 10 to about $10^6$. The nanoparticles may have an average largest dimension from about 50 nanometers to about 5000 nanometers. In various embodiments, the ratio of average particle size of metal particles to average particle size of nanoparticles is from about 1 to about $10^4$, such as from about 10 to about 1000.

In some embodiments, the composition includes an assembly aid disposed between the nanoparticles and surfaces of the metal particles. The assembly aid may be selected from the group consisting of surfactants, salts, dissolved ions, charged molecules, polar or non-polar solvents, hierarchically sized particulates, surface etchants, and combinations thereof, for example.

BRIEF DESCRIPTION OF THE FIGURES

FIG. 6 is a flowchart for an exemplary method to produce a nanofunctionalized metal powder utilizing a liquid-phase mixing media, in some embodiments.

FIG. 7 is a flowchart for an exemplary method to produce a nanofunctionalized metal powder, utilizing a compressed/liquefied gas or supercritical fluid, in some embodiments.

FIG. 8 is a flowchart for an exemplary method to produce a nanofunctionalized metal powder, utilizing a gas-phase mixing media, in some embodiments.

FIG. 9 is a flowchart for an exemplary method to produce a nanofunctionalized metal powder, utilizing electrostatic interactions (in a gas phase and/or in a liquid phase), in some embodiments.

FIG. 10 is a flowchart for an exemplary method to produce a nanofunctionalized metal powder, in which nanoparticles are generated in situ, in some embodiments.

DETAILED DESCRIPTION OF EMBODIMENTS OF THE INVENTION

Figure 1:
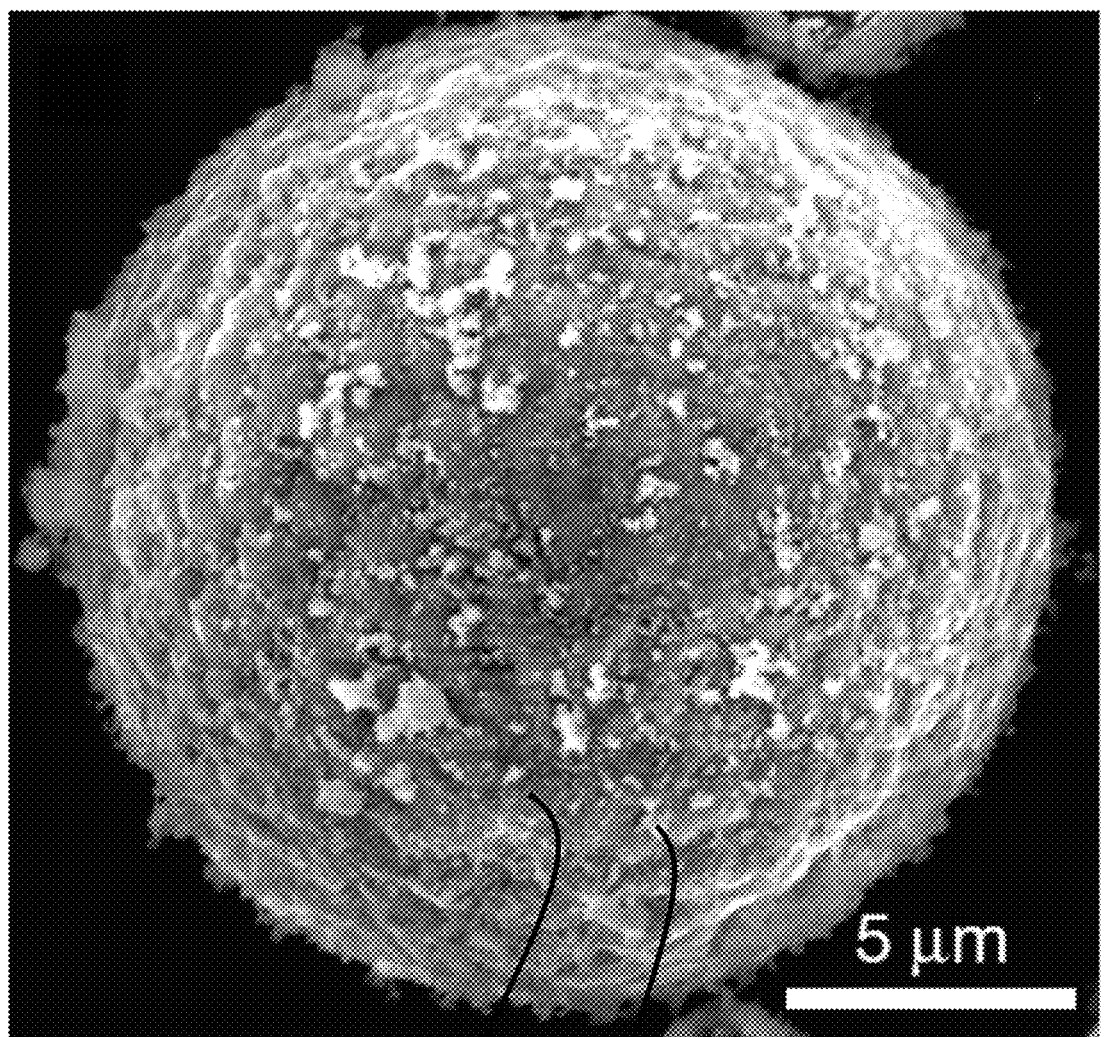
FIG. 1 is a scanning electron microscopy (SEM) image of Al 7075 powder nanofunctionalized with $TiB_2$ nanoparticles (scale bar 5 μm), in some embodiments.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This patent application describes several methodologies for the production of nanofunctionalized powder feedstock, especially nanofunctionalized metal powders. The nanofunctionalized powders may be used in additive manufacturing or as raw materials in other applications that can benefit from nanofunctionalization.

Some embodiments of the present invention utilize materials, methods, and principles described in commonly owned U.S. patent application Ser. No. 15/209,903, filed Jul. 14, 2016, U.S. patent application Ser. No. 15/808,872, filed Nov. 9, 2017, U.S. patent application Ser. No. 15/808,877, filed Nov. 9, 2017, and/or U.S. patent application Ser. No. 15/808,878, filed Nov. 9, 2017, each of which is hereby incorporated by reference herein. For example, certain embodiments utilize functionalized powder feedstocks as described in U.S. patent application Ser. No. 15/209,903. The present disclosure is not limited to those functionalized powders. This specification also hereby incorporates by reference herein Martin et al., "3D printing of high-strength aluminium alloys," *Nature* vol. 549, pages 365-369 and supplemental online content (extended data), Sep. 21, 2017, in its entirety.

The methods described herein may be used to create nanofunctionalized materials such as, but not limited to, materials depicted in FIGS. 1 to 5 (described later). While this disclosure is focused on metal powders, other embodiments are directed to nanofunctionalization of polymer particles, ceramic particles, glass particles, carbon particles, or mixtures of different materials.

Functionalized feedstocks may be powder feedstocks. As intended herein, "powder feedstocks" refers to any powdered metal, ceramic, polymer, glass, composite, or combination thereof. In preferred embodiments, the powder feedstocks are metals or metal-containing compounds, such as (but not limited to) Al, Mg, Ni, Fe, Cu, Ti, V, Si, or combinations thereof, for example.

The nanoparticles or microparticles are typically a different composition than the base powder. Nanoparticles or microparticles may include metals, ceramics, cermets, intermetallic alloys, oxides, carbides, nitrides, borides, polymers, carbon, and combinations thereof, for example, or other materials which upon processing form one or more of the aforementioned materials.

Generally speaking, the nanofunctionalized materials may contain one or more alloying elements selected from the group consisting of Si, Fe, Cu, Ni, Mn, Mg, Cr, Zn, V, Ti, Bi, Ga, Pb, or Zr. Other alloying elements may be included, such as (but not limited to) H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. These other alloying elements may function as grain refiners, as strength enhancers, as stability enhancers, or a combination thereof.

In some embodiments, the nanoparticles or microparticles contain one or more elements selected from the group consisting of zirconium, tantalum, niobium, titanium, and combinations, oxides, nitrides, hydrides, carbides, or borides thereof. As a specific example pertaining to zirconium, the zirconium may be present as $ZrH_x$ (x=0 to 4), i.e. in hydride form when x>0. An exemplary zirconium hydride is $ZrH_2$.

Powder particle sizes are typically between about 1 micron and about 1 millimeter, but in some cases could be as much as about 1 centimeter. The powdered feedstock may be in any form in which discrete particles can be reasonably distinguished from the bulk. The powder may be present as loose powders, a paste, a suspension, or a green body, for example. A green body is an object whose main constituent is weakly bound powder material, before it has been melted and solidified. The functionalized powder feedstocks may be converted into a geometric object, such as a wire, by controlling melting and solidification. The geometric object may itself be a functionalized precursor feedstock for another process, or may be a final part.

Powder particles may be solid, hollow, or a combination thereof. Particles can be made by any means including, for example, gas atomization, milling, cryomilling, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, the particles within the powder feedstock are rod-shaped particles or domains resembling long sticks, dowels, or needles. The average diameter of the rod-shaped particles or domains may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual shape.

"Surface functionalization" refers to a surface modification on the powdered materials, which modification affects the solidification behavior (e.g., solidification rate, yield, grain quality, heat release, etc.) of the powder materials. In various embodiments, a powdered material is functionalized with about 1%, 2%, 5%, 10%, 15%, 20%, 25%, 30%, 40%, 50%, 60%, 70%, 80%, 85%, 90%, 95%, 99%, or 100% of the surface area of the powdered material having surface-functionalization modifications. The surface modification maybe a surface-chemistry modification, a physical surface modification, or a combination thereof.

In some embodiments, the surface functionalization includes a nanoparticle coating and/or a microparticle coating. The nanoparticles and/or microparticles may include a metal, ceramic, polymer, or carbon, or a composite or combination thereof. The surface functionalization preferably includes nanoparticles that are chemically or physically disposed on the surface of the powder materials.

Nanoparticles are particles with the largest dimension between about 1 nm and about 5000 nm. A preferred size of nanoparticles is about 2000 nm or less, about 1500 nm or less, or about 1000 nm or less. In some embodiments, nanoparticles are at least 50 nm in size. Microparticles are particles with the largest dimension between about 1 micron and about 1000 microns. The ratio of average particle size of microparticles to average particle size of nanoparticles may vary, such as about 1, about 10, about $10^2$, about $10^3$, about $10^4$, or about $10^5$. In some embodiments, this ratio is from about 10 to about 1000.

The nanoparticle or microparticle size may be selected based on the desired properties and final function of the assembly. Generally speaking, nanoparticles are preferred over microparticles for functionalization. However, references in this specification to nanoparticles should be understood to include embodiments in which microparticles are used in place of, or in addition to, nanoparticles.

Nanoparticles or microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter. The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the powder material particles.

Nanoparticles or microparticles may be attached using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

Many methods are possible for nanofunctionalizing powders. Some methods of producing surface-functionalized powder materials include immersion deposition, electroless deposition, vapor coating, solution/suspension coating of particles with or without organic ligands, and utilizing electrostatic forces and/or Van der Waals forces to attach particles through mixing. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein.

In some variations, a solvent approach is employed in which a solvent (such as water or tetrahydrofuran) and nanoparticles are added to a base powder feedstock, mixed, and then dried. The choice of solvent(s) will depend on solvent compatibility of the nanoparticles and base powder. The solvent should dissolve or suspend at least one of the components (nanoparticles or base powder). In certain embodiments, a slurry of dispersed nanoparticles in solvent is sprayed on powder feedstock while mixing in order to coat all the feedstock powders with nanoparticles. Following removal of solvent, Van der Waals forces, chemical bonds, physical adsorption, or other forces may cause the nanoparticles to be retained on surfaces of the powder particles. In certain co-solvent embodiments, nanoparticle precipitation is triggered by mixing a poor co-solvent into a homogeneous solution that contains the nanoparticles.

The nanoparticles may be dissolved in a solvent that has lower surface energy than the nanoparticles. When this solvent is evaporated from a mixture of nanoparticles and microparticles, the nanoparticles are drawn by capillary forces to microparticle surfaces, in some embodiments.

The solvent for dissolving or suspending nanoparticles and/or base powder may be selected from polar organic solvents (e.g., acetone), non-polar organic solvents (e.g., n-hexane), polar inorganic solvents (e.g., water), non-polar inorganic solvents, ionic liquids, compressed and liquefied gases (e.g., liquefied carbon dioxide), supercritical fluids (e.g., supercritical carbon dioxide), or a combination thereof.

In some embodiments, the solvent comprises or consists essentially of a compressed and liquefied gas and/or a supercritical fluid. In certain embodiments, the solvent is liquefied or supercritical $CO_2$. Employing a liquefied or supercritical $CO_2$ solution of nanoparticles and powder feedstock allows mixing of the powder particles in a fluidized bed, with the benefit of not requiring a flammable solvent (i.e., mixing is conducted in an atmosphere incapable of igniting). After nanofunctionalization, the $CO_2$ may be vented off quickly and recycled, thereby eliminating waste while also drying the powder. Following removal of liquefied or supercritical $CO_2$, Van der Waals forces, chemical bonds, physical adsorption, or other forces may cause the nanoparticles to be retained on surfaces of the powder particles.

In some variations, nanoparticles are assembled onto powder particles via dry mixing, in which nanoparticles are added to dry powder feedstock and mixed. The dry mixing may be accomplished by stirring, rolling, vibration, ball milling, centrifugation, fluidized-bed blending, sonication, or another mechanical technique. Dry mixing may be carried out with a gas-containing mixing media, such as (but not limited to) air, nitrogen, carbon dioxide, argon, or a combination thereof. Following dry mixing, Van der Waals forces, chemical bonds, physical adsorption, or other forces may cause the nanoparticles to be retained on surfaces of the powder particles.

Sonication is the application of sound energy (such as at a frequency of 20 kHz or more) to agitate the nanoparticles and powder, to promote mixing and assembly.

When dry mixing using a gas-phase mixing media, it is preferable to maintain an atmosphere to retain the mixing media, the powder particles, and the nanoparticles in the desired state(s). Also, a closed environment is preferred to avoid the escape of particles from the system.

In some variations, nanoparticles are assembled onto powder particles via electrostatic interactions. Electrostatic assembly may be carried out by introducing opposite electrical charges, or at least polarities, to the nanoparticles versus the powder particle surfaces, prior to or during nanofunctionalization. Electrostatic interactions can be preferred since they are generally isotropic and reasonably strong. Electrostatic assembly may be done with wet mixing (i.e. with a solvent present), dry mixing, or a sequential combination thereof. For example, the powder particles may be blown as dry material while mixing with nanoparticles, inducing a static charge that enables nanoparticles to be retained on surfaces of the powder particles. In these variations, electrostatic forces cause the nanoparticles to be retained on surfaces of the powder particles. Charged nanoparticles (induced from blowing as a dry material) may be deposited onto oppositely charged powder surfaces, along with chemical bond formation. Electrical charges may also be induced by exposure to an electrical or electromagnetic field, or by chemical reaction, for example.

Other techniques for assembling nanoparticles onto powder particles include, but are not limited to, centrifuge sedimentation, electromagnetic sedimentation, electrochemical deposition, and pulse-laser deposition. Various force fields may be utilized, such as electric fields, magnetic fields, or physical force fields. Physical forces may include high-velocity impingement, viscous flow, or large amplitude oscillatory shear, for example.

Selective placement techniques may be utilized to place individual atoms or atom clusters onto powder particle surfaces. While these techniques theoretically work, they are expensive, although costs are coming down for atom-scale techniques (e.g., atomic vapor-cell systems). In these embodiments, nanoparticles may be grown on surfaces at desired locations by introducing nanoparticle precursors or components, in solid, liquid, or vapor form.

In any of these method embodiments, the nanoparticles may be generated ex situ, generated in situ, or a combination thereof. Ex situ generation of nanoparticles means that the nanoparticles are introduced to the powder surface already in the form of nanoparticles, from a prior step. In situ generation of nanoparticles means that nanoparticles are made from a precursor that has already been applied, or is continuously applied, to the powder surface. For example, nanoparticles may be generated in situ by pulse-wire discharge (wire explosion), solidification from a vapor phase containing nanoparticle precursors, vaporization followed by solidification, or other means. In conjunction with such in situ nanoparticle formation, the powder feedstock may be mixed for assembly by wet mixing, dry mixing, electrostatic interactions, or a combination thereof.

Step (b) may include ex situ generation of the nanoparticles, followed by step (c). In some embodiments, step (b) comprises in situ generation of the nanoparticles, followed by or simultaneously with step (c).

Assembly aids may be incorporated into any of these methods. Assembly aids enhance the retention of nanoparticles on surfaces of the powder particles. In particular, assembly aids may enhance the chemical kinetics of nanoparticle assembly, the thermodynamics of nanoparticle assembly, or the diffusion or mass transport of nanoparticle assembly, for example. Assembly aids may be selected from the group consisting of surfactants, salts, dissolved ions, charged molecules, polar or non-polar solvents, hierarchically sized particulates, surface etchants for surface texture, and combinations thereof. For example, surfactants may reduce surface tension between nanoparticles and powder surfaces, resulting in better wetting and assembly. Salts or ions may alter the surface charge of the nanoparticles or powder surfaces, resulting in ionic bonds that enhance the assembly. Surface etchants may physically etch the surface of the powder to promote adsorption of nanoparticles.

The powder surface, the nanoparticles, or both of these may be functionalized with materials to enhance chemical or electrostatic attachment of the powder particles with nanoparticles. In some embodiments, for example, nanoparticle coatings may be applied using immersion deposition in an ionic liquid, depositing a more-noble metal on a substrate of a less-noble, more-electronegative metal by chemical replacement from a solution of a metallic salt of the coating metal. The metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof.

Organic ligands may be reacted onto a reactive metal, in some embodiments for depositing nanoparticles. The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium. Organic ligands may be selected from the group consisting of aldehydes, alkanes, alkenes, silicones, polyols, poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), poly(carboxymethylcellulose), poly(D- or L-lysine), poly(L-glutamic acid), poly(L-aspartic acid), poly(glutamic acid), heparin, dextran sulfate, 1-carrageenan, pentosan polysulfate, mannan sulfate, chondroitin sulfate, and combinations or derivatives thereof.

The nanoparticles may be in the form of a monolayer, a multilayer, or less than one monolayer (e.g., from about 1% to 100% of one monolayer) and may be organized or unorganized at the powder surfaces, depending on the method employed. When high surface coverage is desired, drop-casting, spin-coating, or spray-coating, or Langmuir-Blodgett coating may be utilized.

In drop-casting, a nanoparticle dispersion is spread over a substrate and allowed to dry under controlled conditions, e.g. pressure and temperature. In principle, film thickness depends on the volume of dispersion used and the particle concentration, both of which can be easily varied. There are also other variables that affect the film structure such as how well the solvent wets the substrate, evaporation rate, capillary forces associated with drying, etc. Generally, it is desirable to use solvents that are volatile, wet the substrate, and are not susceptible to thin film instabilities (de-wetting). Water tends to be a poor solvent for drop-casting due to the low vapor pressure and large surface tension. Organic solvents (such as hexane, toluene, alcohols, or halogenated solvents) are often good choices for nanoparticles with hydrophobic capping ligands.

Spin-coating often provides more uniform film thicknesses across the substrate compared with drop-casting, and can accommodate larger substrates. In this technique, a substrate is spun at high speed and a volume of material with known particle concentration is introduced into the center. Centrifugal force leads to uniform spreading of the dispersion across the substrate, followed by evaporation of solvent to yield a thin particle film. Film thickness depends on the dispersion concentration, volume, and the rotational velocity. As with drop-casting, solvents other than water are favored. Slowly withdrawing a substrate from a nanoparticle dispersion causes particles to be drawn into the meniscus and deposited as the thin liquid layer dries.

Spray-coating utilizes a homogenous, aerosolized stream applied onto a target substrate. For example, a syringe pump may be used to supply a constant liquid flow to a nebulizer where the stream is combined with an inert gas. The resulting mixture forms aerosolized droplets (containing nanoparticles) that deposit onto the substrate (powder particles) in a homogenous manner. The nebulizer may be attached to a movable platform that covers a wide range of area. Volatile solvents are preferred to maximize liquid evaporation and reduce any potential nanoparticle aggregation associated with capillary forces during drying.

Langmuir-Blodgett troughs offer a high level of control over the nanoparticle deposition process since the formation of the nanoparticle film can be performed separately from the transfer of the film to the substrate (powder particles). In using this technique, a dispersion of nanoparticles is evaporated onto an immiscible liquid substrate in the Langmuir-Blodgett trough. The nanoparticle layer can then be compressed using a movable barrier to obtain uniform monolayer or sub-monolayer films over relatively large areas. A substrate can be dipped into the particle layer, or a pre-submerged substrate can be withdrawn, and the nanoparticle film deposits at the liquid-solid interface. Uniform film formation across the powder particles is possible.

FIG. 6 is a flowchart for an exemplary method 600 to produce a nanofunctionalized metal powder. In step 610, metal particles containing one or more metals are provided. In step 620, nanoparticles containing one or more elements or derivatives thereof are provided. In step 630, nanoparticles are disposed onto surfaces of metal particles, in the presence of liquid-phase mixing media, generating nanofunctionalized metal particles. Step 640 isolates and recovers nanofunctionalized metal particles, thereby generating a nanofunctionalized metal powder.

FIG. 7 is a flowchart for an exemplary method 700 to produce a nanofunctionalized metal powder. In step 710, metal particles containing one or more metals are provided. In step 720, nanoparticles containing one or more elements or derivatives thereof are provided. In step 730, nanoparticles are disposed onto surfaces of metal particles, in the presence of liquid-phase mixing media containing a compressed/liquefied gas or supercritical fluid (e.g., $CO_2$), generating nanofunctionalized metal particles. Step 740 isolates and recovers nanofunctionalized metal particles, thereby generating a nanofunctionalized metal powder.

FIG. 8 is a flowchart for an exemplary method 800 to produce a nanofunctionalized metal powder. In step 810, metal particles containing one or more metals are provided. In step 820, nanoparticles containing one or more elements or derivatives thereof are provided. In step 830, nanoparticles are disposed onto surfaces of metal particles, in the presence of gas-phase mixing media (e.g., $N_2$), generating nanofunctionalized metal particles. Step 840 isolates and recovers nanofunctionalized metal particles, thereby generating a nanofunctionalized metal powder.

FIG. 9 is a flowchart for an exemplary method 900 to produce a nanofunctionalized metal powder. In step 910, metal particles containing one or more metals are provided. In step 920, nanoparticles containing one or more elements or derivatives thereof are provided. In step 930, nanoparticles are disposed onto surfaces of metal particles, utilizing electrostatic interactions (in a gas phase and/or in a liquid phase), generating nanofunctionalized metal particles. Step 940 isolates and recovers nanofunctionalized metal particles, thereby generating a nanofunctionalized metal powder.

FIG. 10 is a flowchart for an exemplary method 1000 to produce a nanofunctionalized metal powder. In step 1010, metal particles containing one or more metals are provided. In step 1020, nanoparticles containing one or more elements or derivatives thereof are generated in situ. In step 1030, nanoparticles are disposed onto surfaces of metal particles, in the presence of mixing media, after or during step 1020, generating nanofunctionalized metal particles. Step 1040 isolates and recovers nanofunctionalized metal particles, thereby generating a nanofunctionalized metal powder.

In some variations, the nanoparticles act as grain refiners to give a unique microstructure for a metal powder produced starting with a nanofunctionalized metal powder as provided above. The grain refiners may be designed with specific compositions for a given metal powder and can be incorporated at higher concentrations than previously possible due to assembly of the grain refiners on the surface of a base metal or metal alloy powder. This approach enables the production of metal alloys that were previously difficult to process.

The materials and methods disclosed herein may be applied to additive manufacturing as well as joining techniques, such as welding. Certain unweldable metals, such as high-strength aluminum alloys (e.g., aluminum alloys Al 7075, Al 7050, or Al 2199) would be excellent candidates for additive manufacturing but normally suffer from hot cracking. The principles disclosed herein allow these alloys to be processed with significantly reduced cracking tendency. In particular, the nanofunctionalized metal powder may be converted to a metal alloy object through various means, such as additive manufacturing or other metal processing, wherein the metal alloy object is characterized by a unique microstructure.

A unique microstructure may be produced in a wide variety of alloy systems, as well as from metal processing beyond additive manufacturing. Incorporation of previously impossible concentrations and types of grain refiners is possible, in this disclosure, due to grain-refining elements being disposed on surfaces of base alloy powder. This process utilizes functionalization to incorporate grain refiners directly at the site of melting, negating the need for expensive processing and making use of commercially available alloy powders. This technique is in contrast to incorporation of grain refiners into the internal regions of powder particles, which requires extremely high temperatures during gas atomization. Such high temperatures can cause volatility of certain alloying elements (including Zn, Mg, and Li), and can be damaging to equipment due to the high reactivity of some elements in metal alloys.

In some embodiments, the metal alloy microstructure (produced starting with the nanofunctionalized metal powder) is "substantially crack-free" which means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example. Large phase boundaries can also form inclusions. Note that these inclusions are different than the desirable nanoparticle inclusions that may form during additive manufacturing.

The metal alloy microstructure may be substantially free of porous defects, in addition to being substantially crack-free. "Substantially free of porous defects" means at least 99 vol % of the metal alloy contains no porous voids having an effective diameter of at least 1 micron.

Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, and optionally to arrive at a final additively manufactured metal part that is substantially free of porous defects in addition to being substantially crack-free.

In some embodiments, the metal alloy microstructure (produced starting with the nanofunctionalized metal powder) has "equiaxed grains" which means that at least 99 vol % of the metal alloy contains grains that are roughly equal in length, width, and height. In the metal alloy, crystals of metal alloy form grains in the solid. Each grain is a distinct crystal with its own orientation. The areas between grains are known as grain boundaries. Within each grain, the individual atoms form a crystalline lattice. Equiaxed grains result when there are many nucleation sites arising from grain-refining nanoparticles contained in the metal alloy microstructure.

The equiaxed grains, and reduction or elimination of cracks, in the final microstructure results from the presence of grain-refining nanoparticles in the initial nanofunctionalized metal powder (in powder form or other geometric form).

The grain-refining nanoparticles are preferably present in a concentration of at least 0.01 vol %, such as at least 0.1 vol %, at least 1 vol %, or at least 5 vol %. In various embodiments, the grain-refining nanoparticles are present in a concentration of about, or at least about, 0.1, 0.2, 0.5, 1, 2, 3, 4, 5, 6, 7, 8, 9, or 10 vol %. The concentration of the grain refiner may be varied by adjusting the amount of grain refiner functionalized on the powder surface, and/or by adjusting the concentration of functionalized micropowders versus non-functionalized micropowders in the final material.

The preferred concentration of grain refiner(s) will depend on the selected alloy and grain refiner. In certain alloys, grain refinement should be minimized to avoid potential detrimental interactions; however, some alloy systems such as Al 7075 can accommodate greater concentrations. Due to the ease of producing and processing the material, routine experimentation can be performed by a person of ordinary skill in the art to inform material selection and concentration for the grain-refining nanoparticles.

Figure 2:
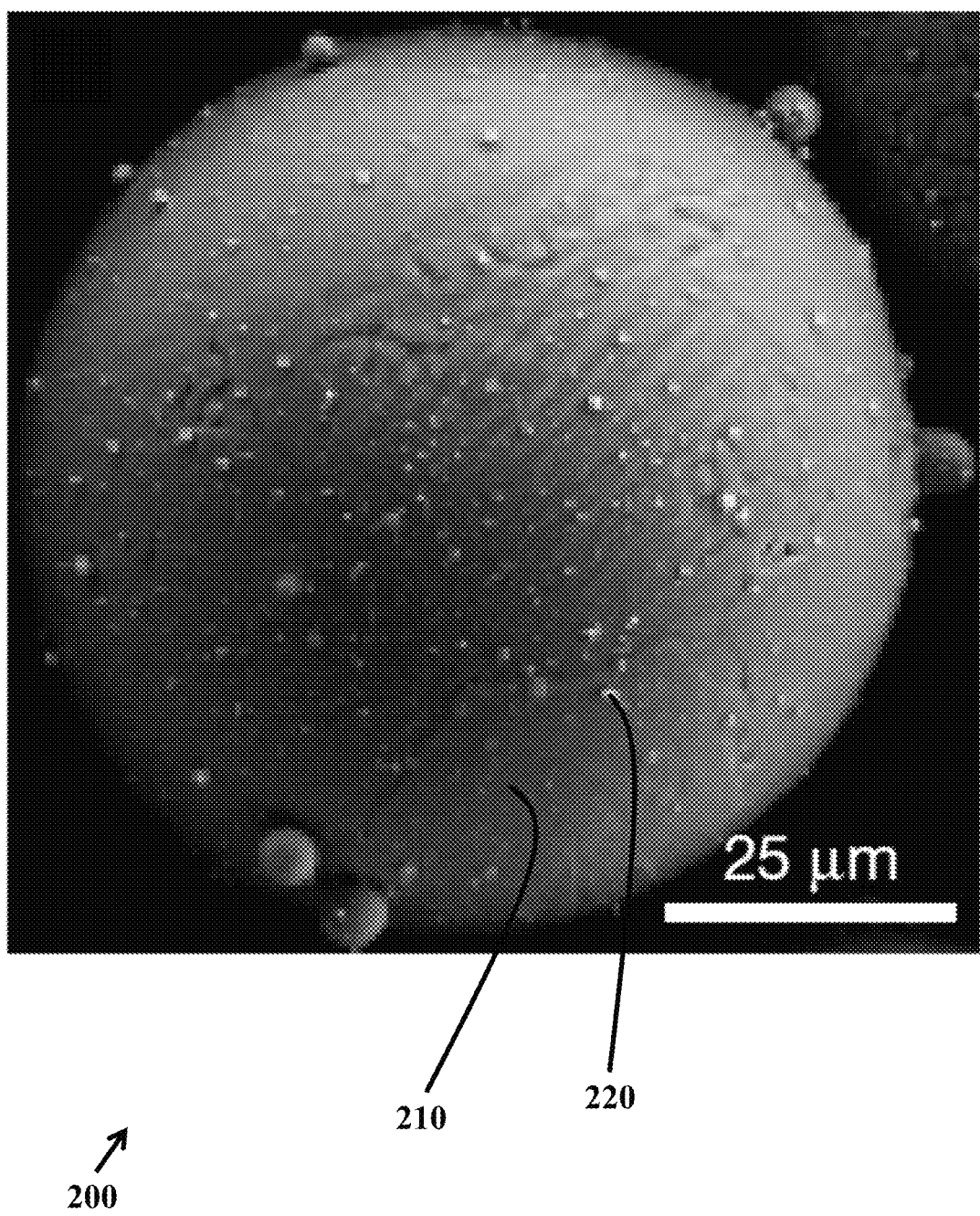
FIG. 2 is an SEM image of TiAl6V4 powder with $ZrH_2$ nanoparticles (scale bar 25 μm), in some embodiments.
Figure 3:
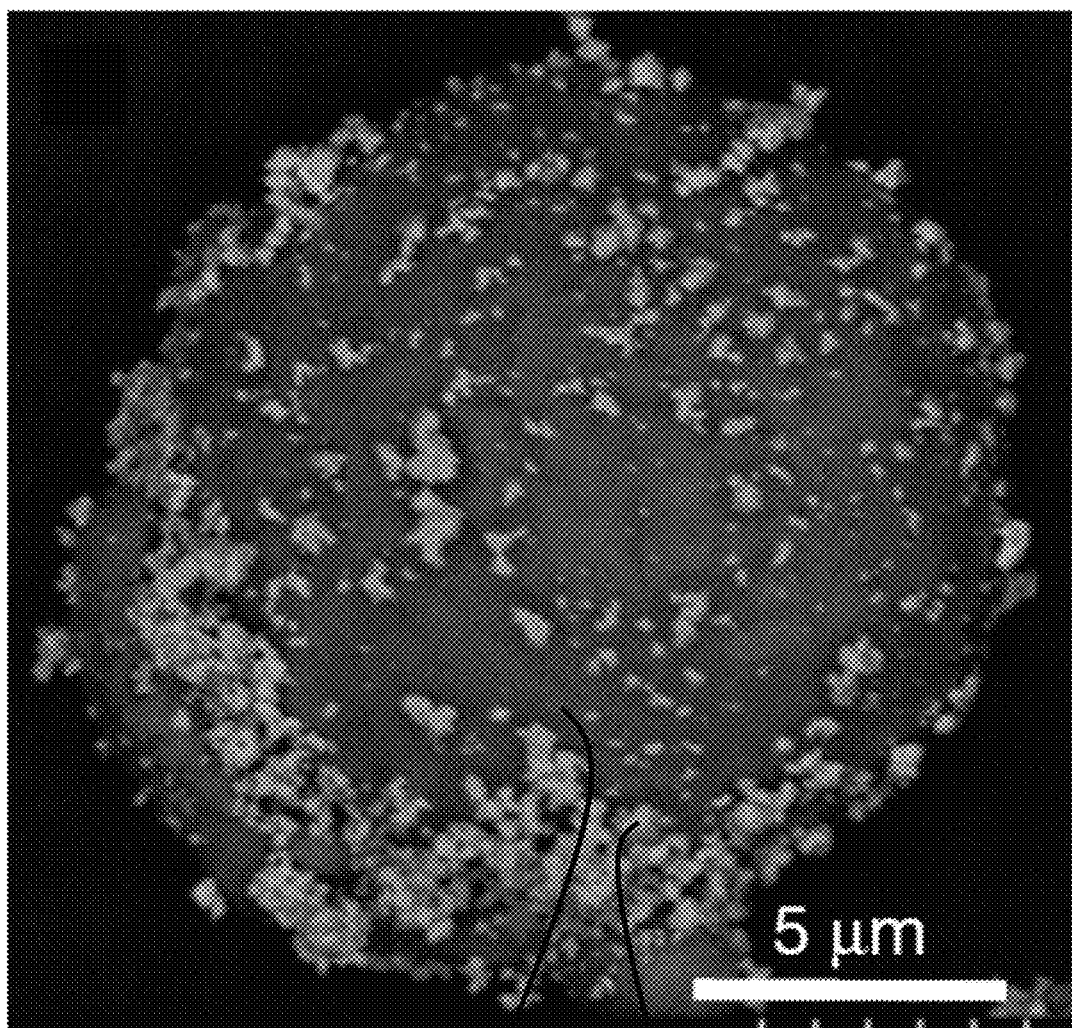
FIG. 3 is an SEM image of Al 7075 powder nanofunctionalized with WC (tungsten carbide) nanoparticles (scale bar 5 μm), in some embodiments.
Figure 4:
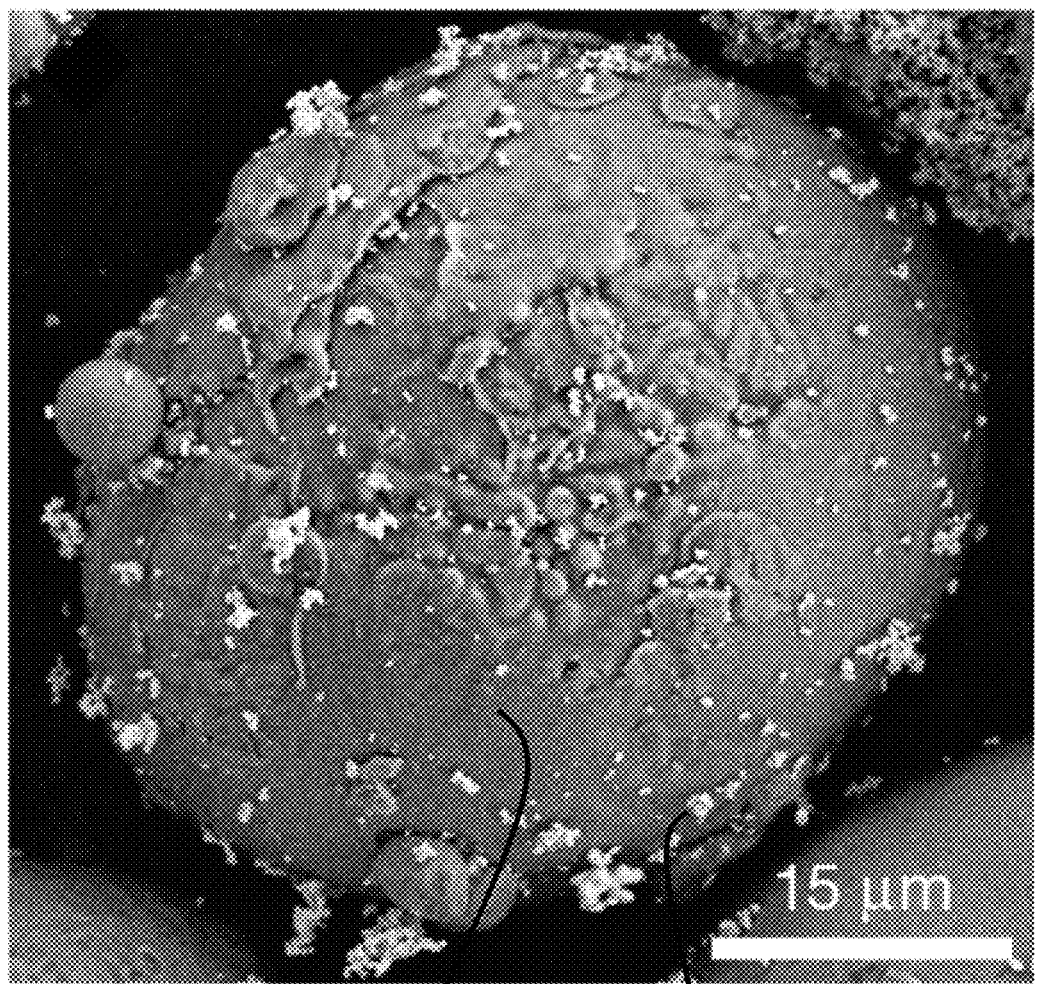
FIG. 4 is an SEM image of AlSi10Mg powder nanofunctionalized with WC nanoparticles (scale bar 5 μm), in some embodiments.
Figure 5:
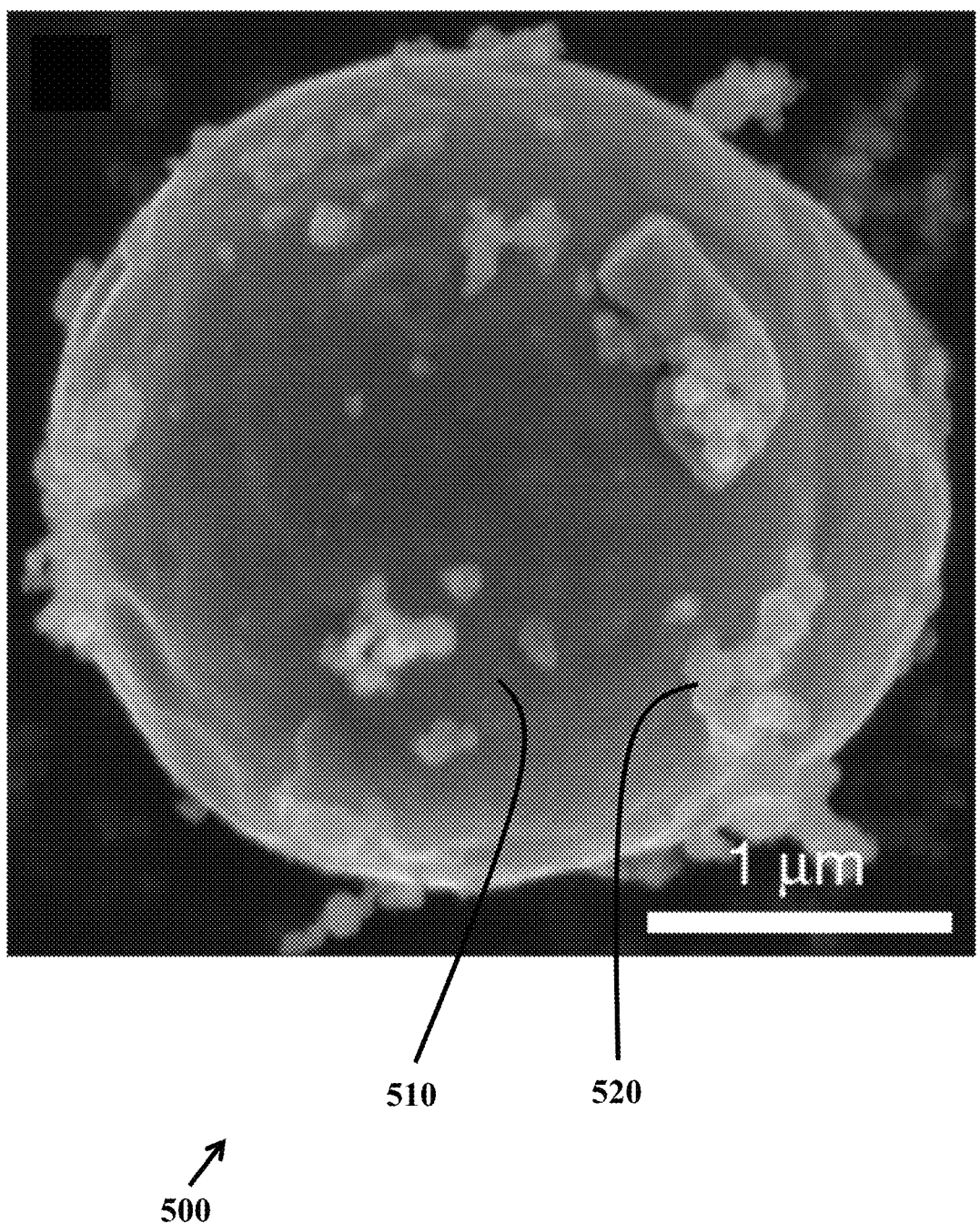
FIG. 5 is an SEM image of Fe powder nanofunctionalized with TiC nanoparticles (scale bar 1 μm), in some embodiments.

FIGS. 1 to 5 are scanning electron microscopy (SEM) images of exemplary micropowders that are functionalized with assembled nanoparticles. FIG. 1 shows Al 7075 powder 110 functionalized with $TiB_2$ nanoparticles 120 (scale bar 5 μm), resulting in nanofunctionalized metal powder 100. FIG. 2 shows TiAl6V4 powder 210 functionalized with $ZrH_2$ nanoparticles 220 (scale bar 25 μm), resulting in nanofunctionalized metal powder 200. FIG. 3 shows Al 7075 powder 310 functionalized with WC (tungsten carbide) nanoparticles 320 (scale bar 5 μm), resulting in nanofunctionalized metal powder 300. FIG. 4 shows AlSi10Mg powder 410 functionalized with WC nanoparticles 420 (scale bar 5 μm), resulting in nanofunctionalized metal powder 400. FIG. 5 shows iron powder 510 functionalized with TiC nanoparticles 520 (scale bar 1 μm) by dry mixing, resulting in nanofunctionalized metal powder 500. The microstructures 100, 200, 300, 400, and 500 of FIGS. 1, 2, 3, 4, and 5, respectively, may be obtained using the methods of FIGS. 6 to 10, described above, in some embodiments.

The nanoparticles are present at a concentration of at least 0.1 vol %, 1 vol %, or 5 vol % in the nanofunctionalized metal powder. In various embodiments, the nanoparticles are present at a concentration of about 0.1, 0.2, 0.3, 0.4, 0.5, 1, 2, 3, 4, 5, 6, 7, 8, 9, or 10 vol % in the nanofunctionalized metal powder.

The number of nanoparticles per microparticle can vary widely. The average number of individual nanoparticles disposed on one microparticle (equivalently, the average number ratio of nanoparticles to powder microparticles) may be about 10, about $10^2$, about $10^3$, about $10^4$, about $10^5$, or about $10^6$, for example. The nanoparticle distribution on the powder particle surface can vary, as shown in FIGS. 1 to 5. In some embodiments, surface regions contain a relatively higher concentration of nanoparticles, which may be agglomerated at the surface in those regions.

The nanoparticle surface coverage may also vary widely, from about 1% to 100%, in various embodiments. The nanoparticle surface coverage is the average area fraction of powder particles that is covered by assembled nanoparticles. For example, the nanoparticle surface coverage may be about, or at least about, 1%, 5%, 10%, 20%, 30%, 40%, 50%, 60%, 70%, 80%, 90%, or 100%. Due to the small size of nanoparticles, benefits are possible with less than 1% surface area coverage.

The selection of the coating/powder composition will be dependent on the desired properties and should be considered on a case-by-case basis. Someone skilled in the art of material science or metallurgy will be able to select the appropriate materials for the intended use, based on the information provided in this disclosure. The processing and final product configuration should also be dependent on the desired properties. Someone skilled in the art of material science, metallurgy, and/or mechanical engineering will be able to select the appropriate processing conditions for the desired outcome, based on the information provided in this disclosure.

In some embodiments, at least one nanoparticle is lattice-matched to within ±5% compared to powder feedstock without the nanoparticle. Preferably, the nanoparticle is lattice-matched to within ±2%, more preferably to within ±0.5%, compared to a powder feedstock without the nanoparticle.

In some embodiments, at least one nanoparticle is atomic density-matched to within ±25% compared to a powder feedstock without the nanoparticle. Preferably, the nanoparticle is atomic density-matched to within ±5%, more preferably to within ±0.5%, compared to a powder feedstock without the nanoparticle.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, a functionalization coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underlying materials, the method of coating, reaction conditions, etc.

In some embodiments, microparticles (rather than nanoparticles) coat micropowders or macropowders. The micropowder or macropowder particles may include ceramic, metal, polymer, glass, or combinations thereof. The microparticles (coating) may include metal, ceramic, polymer, carbon, or combinations thereof. In the case of microparticles coating other micropowders or macropowders, functionalization preferably means that the coating particles are of significantly different dimension(s) than the base powder. For example, the microparticles may be characterized by an average dimension (e.g., diameter) that is less than 20%, 10%, 5%, 2%, or 1% of the largest dimension of the coated powders.

Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

Some variations provide a solid metal alloy object or article comprising at least one solid phase (i) containing a nanofunctionalized powdered material as described, or (ii) derived from a liquid form of a nanofunctionalized powdered material as described. The solid phase may form from 0.25 wt % to 100 wt % of the solid object or article. The solid metal alloy object or article may be a geometric object (e.g., wire or rod) that is useful for metal processing, instead of powder feedstock. Powder metallurgy processing techniques include, but are not limited to, hot pressing, low-pressure sintering, extrusion, metal injection molding, and additive manufacturing.

The intermediate or final article may be selected from the group consisting of a sintered structure, a coating, a geometric object, a billet, an ingot, a net-shape part, a near-net-shape part, a welding filler, and combinations thereof. The intermediate or final article may be produced from the coated reactive metal by a process comprising one or more techniques selected from the group consisting of hot pressing, cold pressing, sintering, extrusion, injection molding, additive manufacturing, electron-beam melting, selective laser sintering, pressureless sintering, and combinations thereof.

Some embodiments produce a master alloy from the nanofunctionalized metal powder. A "master alloy" is well-defined in the art and refers to a concentrated alloy source which can be added to a metal being processed, to introduce the appropriate alloying elements into the system. Master alloys are particularly useful when the alloying elements are difficult to disperse or in low weight quantities. In the case of the dispersion difficulties, pre-dispersed master alloys increase wetting and avoid agglomeration. In the case of low quantities, it is much easier to control additions when heavier weights of pre-alloyed material can be added, to avoid weighing errors for the minor alloying elements. The master alloy may ultimately be processed by a variety of operations including, but are not limited to, forging, rolling, extrusion, drawing, sand casting, die casting, investment casting, powder metallurgy, additive manufacturing, or others.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A composition comprising a nanofunctionalized metal powder, said composition comprising:
   (a) metal particles containing titanium; and
   (b) nanoparticles containing one or more elements selected from the group consisting of zirconium, tantalum, niobium, titanium, and oxides, nitrides, carbides, or borides thereof, and combinations of the foregoing,
   wherein said nanoparticles are lattice-matched to within ±5% of said metal particles.

2. The composition of claim 1, wherein said nanoparticles are present at a concentration of at least 0.1 vol % in said nanofunctionalized metal powder.

3. The composition of claim 2, wherein said nanoparticles are present at a concentration of at least 1 vol % in said nanofunctionalized metal powder.

4. The composition of claim 1, wherein the average number ratio of said nanoparticles to said metal particles is from about 10 to about $10^6$.

5. The composition of claim 1, wherein said nanoparticles have an average largest dimension from about 50 nanometers to about 5000 nanometers.

6. The composition of claim 1, wherein the ratio of average particle size of said metal particles to average particle size of said nanoparticles is from about 1 to about $10^4$.

7. The composition of claim 6, wherein said ratio is from about 10 to about 1000.

8. The composition of claim 1, wherein said composition includes an assembly aid disposed between said nanoparticles and surfaces of said metal particles.

9. The composition of claim 8, wherein said assembly aid is selected from the group consisting of surfactants, salts, dissolved ions, charged molecules, polar or non-polar solvents, hierarchically sized particulates, surface etchants, and combinations thereof.

10. The composition of claim 1, wherein said nanoparticles are lattice-matched to within ±2% of said metal particles.

11. The composition of claim 1, wherein at least 90% of said nanoparticles are disposed chemically or physically on said surfaces of said metal particles.

12. A composition comprising a nanofunctionalized metal powder, said composition comprising:
(a) metal particles containing titanium; and
(b) nanoparticles containing one or more elements selected from the group consisting of zirconium, tantalum, niobium, titanium, and oxides, nitrides, hydrides, carbides, or borides thereof, and combinations of the foregoing,
wherein said nanoparticles are present at a concentration of at least 0.1 vol % in said nanofunctionalized metal powder,
wherein said nanoparticles are disposed chemically or physically on at least 90% of the surface area of said surfaces of said metal particles, and
wherein said nanoparticles are lattice-matched to within ±5% of said metal particles.

13. The composition of claim 12, wherein said nanoparticles are present at a concentration of at least 1 vol % in said nanofunctionalized metal powder.

14. The composition of claim 12, wherein the average number ratio of said nanoparticles to said metal particles is from about 10 to about $10^6$.

15. The composition of claim 12, wherein said nanoparticles have an average largest dimension from about 50 nanometers to about 5000 nanometers.

16. The composition of 13, wherein the ratio of average particle size of said metal particles to average particle size of said nanoparticles is from about 1 to about $10^4$.

17. The composition of claim 12, wherein said composition includes an assembly aid disposed between said nanoparticles and said surfaces of said metal particles.

18. The composition of claim 17, wherein said assembly aid is selected from the group consisting of surfactants, salts, dissolved ions, charged molecules, polar or non-polar solvents, hierarchically sized particulates, surface etchants, and combinations thereof.

19. The composition of claim 12, wherein said nanoparticles are lattice-matched to within ±2% of said metal particles.

20. A nanofunctionalized metal powder produced by a process comprising:
(a) providing metal particles containing titanium;
(b) providing nanoparticles containing one or more elements selected from the group consisting of zirconium, tantalum, niobium, titanium, and oxides, nitrides, carbides, or borides thereof, and combinations of the foregoing, wherein said nanoparticles are lattice-matched to within ±5% of said metal particles;
(c) disposing said nanoparticles onto surfaces of said metal particles, in the presence of mixing media, thereby generating nanofunctionalized metal particles; and
(d) isolating and recovering said nanofunctionalized metal particles as a nanofunctionalized metal powder.

21. The composition of claim 20, wherein said nanoparticles are present at a concentration of at least 0.1 vol % in said nanofunctionalized metal powder, and wherein at least some of said nanoparticles are disposed chemically or physically on surfaces of said metal particles.

22. The composition of claim 20, wherein at least 90% of said nanoparticles are disposed chemically or physically on said surfaces of said metal particles.

* * * * *